US011740604B2

(12) United States Patent
Ouchi

(10) Patent No.: US 11,740,604 B2
(45) Date of Patent: Aug. 29, 2023

(54) CONTROL DEVICE

(71) Applicant: OMRON Corporation, Kyoto (JP)

(72) Inventor: Toshihisa Ouchi, Ritto (JP)

(73) Assignee: OMRON Corporation, Kyoto (JP)

( * ) Notice: Subject to any disclaimer, the term of this patent is extended or adjusted under 35 U.S.C. 154(b) by 128 days.

(21) Appl. No.: 17/604,761

(22) PCT Filed: Mar. 12, 2020

(86) PCT No.: PCT/JP2020/010716
§ 371 (c)(1),
(2) Date: Oct. 19, 2021

(87) PCT Pub. No.: WO2020/230433
PCT Pub. Date: Nov. 19, 2020

(65) Prior Publication Data
US 2022/0179386 A1 Jun. 9, 2022

(30) Foreign Application Priority Data
May 13, 2019 (JP) .................................. 2019-090794

(51) Int. Cl.
*G05B 19/05* (2006.01)

(52) U.S. Cl.
CPC ......... *G05B 19/058* (2013.01); *G05B 19/052* (2013.01); *G05B 2219/1214* (2013.01); *G05B 2219/1215* (2013.01)

(58) Field of Classification Search
CPC ................ G05B 19/058; G05B 19/052; G05B 2219/1214; G05B 2219/1215;
(Continued)

(56) References Cited

U.S. PATENT DOCUMENTS

| 5,150,288 A * | 9/1992 | Imai ................... G05B 19/4185 700/115 |
| 2003/0091059 A1* | 5/2003 | Pike ....................... H04L 49/351 370/468 |

(Continued)

FOREIGN PATENT DOCUMENTS

| CN | 103403720 | 11/2013 |
| JP | H0951331 | 2/1997 |

(Continued)

OTHER PUBLICATIONS

Shinya Higashikura, "Control device, control method, and program" (Espacenet English Translation), Jan. 25, 2013, Omron Tateisi Electronics Co, Espacenet (Year: 2013).*

(Continued)

*Primary Examiner* — Christopher E. Everett
*Assistant Examiner* — Christopher W Carter
(74) *Attorney, Agent, or Firm* — JCIPRNET

(57) ABSTRACT

In a master device (control device) that employs a configuration list, setup change is performed easily without requiring a complicated operation with respect to a partial change in the configuration of a slave-side system on a slave side. A control unit (11) of a control device (10) is configured to perform communication for inquiring about device information to an address in an active configuration list through a communication unit (12), and determine to be abnormal when the result of the communication with respect to a common portion of a slave-side system (20) is different from the device information in the active configuration list.

6 Claims, 9 Drawing Sheets

(58) Field of Classification Search
CPC ............ G05B 19/056; H04L 12/40169; H04L 41/0866; H04L 2012/4026; H04L 12/403; H04L 41/0856; Y02P 90/02
See application file for complete search history.

(56) References Cited

U.S. PATENT DOCUMENTS

| | | | |
|---|---|---|---|
| 2007/0201387 A1 | 8/2007 | Kurasawa et al. | |
| 2009/0187266 A1* | 7/2009 | Kotula | G06Q 10/08 700/110 |
| 2014/0122631 A1 | 5/2014 | Tahara et al. | |
| 2018/0234301 A1 | 8/2018 | Ozaki et al. | |

FOREIGN PATENT DOCUMENTS

| | | |
|---|---|---|
| JP | 2009237758 | 10/2009 |
| JP | 2009266047 | 11/2009 |
| JP | 2012034080 | 2/2012 |
| JP | 2014068293 | 4/2014 |
| JP | 2014146070 | 8/2014 |
| JP | 6299064 | 3/2018 |
| WO | 2012124163 | 9/2012 |
| WO | 2014200070 | 12/2014 |
| WO | 2016143104 | 9/2016 |

OTHER PUBLICATIONS

Ji Li, "Programmable logic controller" (ip.com English Translation), Aug. 22, 2017, Siemens LTD China, ip.com (Year: 2017).*

"Search Report of Europe Counterpart Application", dated Dec. 13, 2022, p. 1-p. 10.

"International Search Report (Form PCT/ISA/210) of PCT/JP2020/010716," dated Jun. 16, 2020, with English translation thereof, pp. 1-4.

"Written Opinion of the International Searching Authority (Form PCT/ISA/237) of PCT/JP2020/010716," dated Jun. 16, 2020, with English translation thereof, pp. 1-8.

"Office Action of China Counterpart Application" with English translation thereof, dated Jul. 5, 2022, p. 1-p. 16.

* cited by examiner

Configuration list (prior art)

| Address | Device information |
|---------|-------------------|
| #1 | A : IN=16 OUT=0 |
| #2 | B : IN=0 OUT=16 |
| #3 | C : IN=16 OUT=0 |

FIG. 11 (RELATED ART)

CONTROL DEVICE

CROSS-REFERENCE TO RELATED APPLICATION

This application is a 371 application of the International PCT application serial no. PCT/JP2020/010716, filed on Mar. 12, 2020, which claims the priority benefits of Japan Patent Application No. 2019-090794, filed on May 13, 2019. The entirety of each of the above-mentioned patent applications is hereby incorporated by reference herein and made a part of this specification.

TECHNICAL FIELD

The present invention relates to a control device.

BACKGROUND ART

In the field of factory automation (FA), various types of devices that share operation processes are controlled. In order to operate various controllers, remote I/Os, and manufacturing equipment used for operations in a certain area such as factory facilities in cooperation, an industrial network system called a field network that connects this equipment is constructed.

In a general industrial network system, a master-slave network composed of various slave devices and master devices is used. A slave device is a device that collects and controls data of facilities installed in a factory. The master device is a device called a programmable logic controller (PLC) that centrally manages these slave devices, for example. DeviceNet (registered trademark) is also one type of such an industrial network system.

In such a network system, an address (node address) is assigned to each slave device. Communication frames formatted to have a predetermined data structure are transmitted and received between a master device and slave devices using addresses, and communication is realized. The master device has a configuration list including addresses assigned to each slave device connected to the network system and device information thereof in order to manage the slave devices. The configuration list is also called a scan list.

FIG. 11 shows a specific example of such a configuration list. In the configuration list, each slave device connected to the network system is listed, and the address assigned to each slave device and its device information are tabulated. In FIG. 11, the number of input terminals and output terminals is stored as an example of device information. For example, the slave device includes an input terminal if it is an input unit that receives a signal from a sensor. Further, for example, the slave device includes an output terminal if it is an output unit for motor control or the like.

The master device attempts to communicate with the address in the configuration list and inquires about the device information of the slave device. If the returned device information is different from that on the configuration list, it is determined that there is an inconsistency in the configuration of the slave-side system. In addition, the same determination is made when communication with the slave device cannot be performed. Then, the input/output (IO) communication to each slave device, which is the communication for controlling the FA device, is stopped, and an abnormality is notified of. The FA administrator thereby detects an abnormality in the system configuration and takes necessary measures.

In this way, in an industrial network such as DeviceNet (registered trademark), the master device checks the configuration of the slave-side system with reference to the configuration list. The configuration list is a definitive list that is not rewritten while the network is running. This prevents occurrence of trouble resulting from inconsistencies in the system configuration of the slave-side system. Further, even if a slave device having an address not listed in the configuration list is connected to the network system, it is possible to efficiently control the slave-side system by not communicating with the device.

CITATION LIST

Patent Literature

Patent Literature 1: Japanese Patent Laid-Open No. 2014-146070

SUMMARY OF INVENTION

Technical Problem

In a production process, it may be desired to change a portion of the process as the products to be produced are switched. Therefore, it may be desirable to replace a portion of the configuration of the slave-side system. However, as described above, in an industrial network using a master device that checks the configuration of the slave-side system using the configuration list, the setup change in such a case is complicated.

In the setup change, after the control of the slave-side system by the master device is stopped, the administrator needs to operate the master device and rewrite the configuration list corresponding to the subsequent production of products. However, rewriting takes time and there is a risk of operation mistakes.

Alternatively, the administrator needs to load a created configuration list from an external device called a tool or a configurator into the master device and change the configuration list. By replacing the configuration list in this way, mistakes in rewriting can be prevented, but there is a risk of operation mistakes in the replacement itself. In addition, in the setup change, the administrator needs to prepare an external device first, and then operate the master device and the external device in cooperation with each other to rewrite the configuration list, which is complicated.

The present invention has been made in view of the above problems, and an object thereof is to realize a control device that can perform setup change easily without requiring a complicated operation with respect to a partial change in the configuration of a slave-side system in a master device (control device) that employs a configuration list.

Solution to Problem

The present invention adopts the following configuration in order to solve the above-mentioned problems.

A control device according to one aspect of the present invention is a control device which is a master device used in a network system in which a plurality of slave devices constituting a slave-side system is connected to the master device, the control device being able to control the slave-side system to switch between a first system configuration and a second system configuration in which a predetermined portion is different from the first system configuration and other configurations are common, the control device including: a communication unit that transmits and receives data to and from the plurality of slave devices; a control unit that controls the communication unit; and a recording unit having at least one configuration list which represents a configuration of the slave-side system and includes an address and device information of each of the slave devices, wherein, when controlling the first system configuration or the second system configuration, the control unit performs communication for inquiring about device information to an address in an active configuration list through the communication unit and determines that an abnormality has occurred at least when a result of the communication with respect to the common portion is different from the device information in the active configuration list.

Advantageous Effects of Invention

According to the above configuration, it is possible to realize a control device that can perform setup change easily without requiring a complicated operation with respect to setup change that incurs a partial change in the configuration of a slave-side system in a master device (control device) that employs a configuration list.

BRIEF DESCRIPTION OF DRAWINGS

FIG. 11 is a diagram showing a configuration list in the prior art.

DESCRIPTION OF EMBODIMENTS

First Embodiment

Hereinafter, an embodiment according to one aspect of the present invention (hereinafter, also referred to as "the present embodiment") will be described with reference to the drawings.

§ 1 Application Example

First, an example of a situation in which the present invention is applied will be described. A control device according to the present embodiment is a master device used in a network system in which a plurality of slave devices constituting a slave-side system is connected to the master device.

The control device according to the present embodiment, which is a master device, can control the slave-side system to switch between a first system configuration and a second system configuration in which a predetermined portion is different from the first system configuration and other configurations are common.

The control device according to the present embodiment includes a communication unit, a control unit, and a recording unit. The communication unit is a functional block that transmits and receives data to and from the plurality of slave devices. The control unit is a functional block that controls the communication unit, executes processing of data acquired through the communication unit or from the recording unit, and outputs the data.

The recording unit is a functional block that stores, reads, and retains data. The recording unit has at least one configuration list including the address and device information of each slave device, which represents the configuration of the slave-side system.

When controlling the first system configuration or the second system configuration, the control unit performs communication for inquiring about device information to an address in an active configuration list through the communication unit. As a result, when the result of the communication with respect to at least the common portion is different from the device information in the active configuration list, it is determined that there is an abnormality.

According to the present embodiment, the control device, which is the master device, applies the configuration list to check the configuration of the slave-side system. This prevents occurrence of trouble resulting from inconsistencies in the configuration of the slave-side system. On the other hand, a change in the predetermined partial configuration of the slave-side system is not determined to be abnormal. As a result, it is possible to realize a control device capable of performing setup change easily without requiring a complicated operation with respect to a change in a predetermined partial configuration of the slave-side system in a master device (control device) that employs a configuration list.

§ 2 Configuration Example (Overall Configuration Including Network System)

Figure 1:
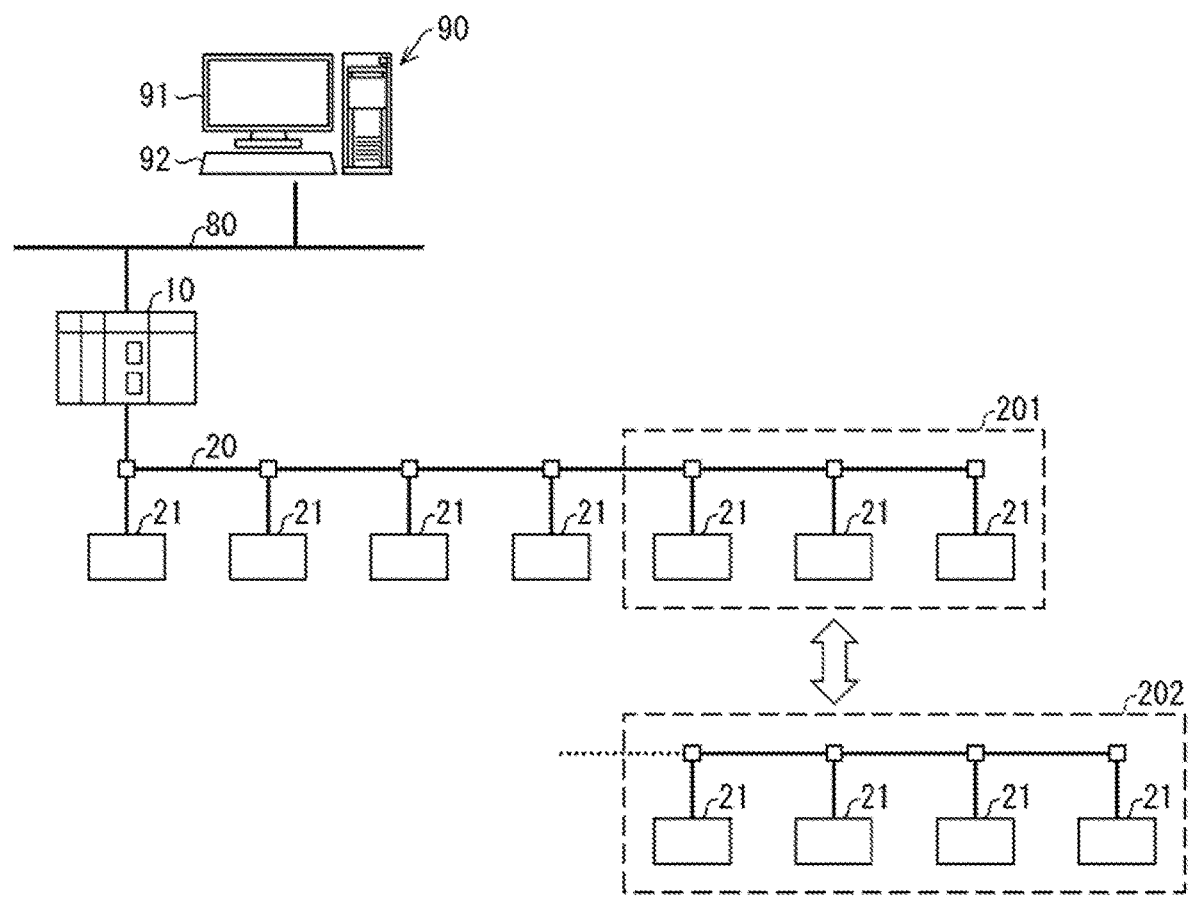
FIG. 1 is a diagram showing a network system to which a control device according to a first embodiment of the present invention is applied.

FIG. 1 is a schematic configuration diagram showing a network system 1 including a control device 10 according to a first embodiment. The network system 1 includes a control device 10 which is a master device and a slave-side system 20 other than the control device 10. As a specific example, DeviceNet (registered trademark) is used as the network system 1.

A plurality of slave devices 21 is connected to the slave-side system 20. A portion of the bundle of the slave-side system 20 is a partial system 201 (a predetermined portion). The network system 1, which is an FA system, is applied to the production of a certain product "a." Then, product "a" produced by the partial system 201 is replaced by another product "b" produced by another partial system 202 (a predetermined portion). As described above, the network system 1 can produce different products when a portion of the configuration of the slave-side system 20 is changed.

The partial system 201 may be a so-called "Null" having no substance. In this case, replacing the partial system 201 with another partial system 202 corresponds to additionally connecting the partial system 202 to the original slave-side system 20. The partial system 202 may be a so-called "Null" having no substance. In this case, replacing the partial system 201 with another partial system 202 corresponds to removing the partial system 201 from the original slave-side system 20. However, the partial system 201 and the partial system 202 are not both "Null" at the same time. In this way, changing or replacing a portion of the configuration of the slave-side system is a concept including additional connection of a partial system and removal of a partial system.

The control device 10, which is a master device, is connected to a configurator 90 via a higher-order network system 80 which is different from the network system 1. As a specific example, Ethernet (registered trademark) is used as the higher-order network system 80. However, the connection method between the control device 10 and the configurator 90 is not limited to the one via the network system, and the devices may be directly connected to each other. In this case, as a specific example, serial communication such as Universal Serial Bus (USB) or Recommended Standard 232 (RS232) may be applied to the connection.

The configurator 90 is a computer capable of collecting various pieces of data from the control device 10 by communicating with the control device 10. The configurator 90 is a computer capable of changing the settings of the control device 10 and providing a control program and a configuration list to the control device 10. The configurator 90 may include a display device 91 and an input device 92.

(Control Device Configuration)

Figure 2:
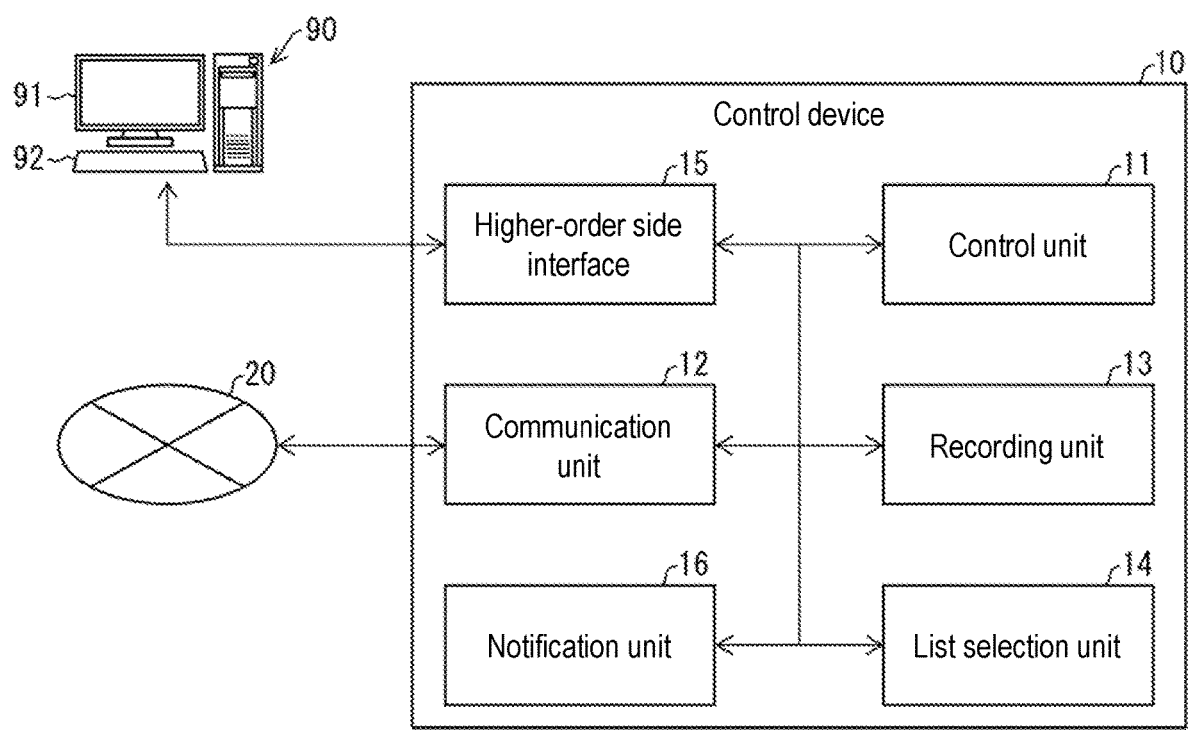
FIG. 2 is a configuration diagram showing the control device according to the first embodiment of the present invention.

FIG. 2 is a diagram showing an example of the configuration of the control device 10 according to the first embodiment. The control device 10 includes a control unit 11, a communication unit 12, a recording unit 13, a list selection unit 14, a higher-order side interface 15, and a notification unit 16.

The communication unit 12 is a functional block that communicates with the plurality of slave devices 21 of the slave-side system 20. The recording unit 13 is a functional block that records, reads, and retains data.

The list selection unit 14 is a functional block for designating an active configuration list from a plurality of configuration lists retained in the recording unit 13. The list selection unit 14 is provided with a user interface such as a switch or a touch panel, on which an active configuration list is selected with an operation performed by an administrator. The list selection unit 14 does not necessarily have to be provided, and in that case, the control unit 11 may select the configuration list in response to an instruction from another device through the communication unit 12 or the higher-order side interface 15. Alternatively, the selection of the list may be instructed by a control program for controlling the slave device 21, executed by the control device 10.

The higher-order side interface 15 is a functional block that communicates with the configurator 90 and the like through the higher-order network system 80.

The notification unit 16 is a functional block that notifies an administrator, an operator, or the like of an abnormality in the configuration of the network system 1. As means for notification, visual means, auditory means and other means may be used. The notification unit 16 may include a display device and notify of an abnormality with characters, illustrations, or the like. Alternatively, the notification unit 16 may include a lamp or a buzzer and notify by lighting or ringing thereof.

The notification unit 16 does not necessarily have to be provided, and in that case, the control unit 11 may notify other devices of an abnormality through the communication unit 12 or the higher-order side interface 15.

The control unit 11 controls these functional blocks including the communication unit 12. The control unit 11 may execute processing of the data acquired through the communication unit 12, the list selection unit 14, the higher-order side interface 15, or from the recording unit 13, and adjust the control according to the processing result. The control unit 11 may execute processing of the data acquired through the communication unit 12, the list selection unit 14, the higher-order side interface 15, or from the recording unit 13, and output the processing result to another functional block.

The recording unit 13 has a plurality of configuration lists representing the configuration of the slave-side system 20. Each configuration list is a table including the address and device information of a slave device 21, as in FIG. 11.

(Configuration List)

In the first embodiment, the recording unit 13 has a configuration list L1 (first configuration list) showing the slave-side system 20 (first system configuration) including the partial system 201. The recording unit 13 also has a configuration list L2 (second configuration list) showing the slave-side system 20 (second system configuration) in a state where the partial system 201 is replaced with the partial system 202. The slave-side system 20 (first system configuration) shown in the configuration list L1 and the slave-side system 20 (second system configuration) shown in the configuration list L2 are different in a predetermined portion (the partial system 201 and the partial system 202) of the slave-side system 20, and other portions (common portions) are the same.

As an example of device information in each configuration list, the numbers of input terminals and output terminals corresponding to digital signals are stored. For example, the slave device 21 includes an input terminal if it is an input unit that receives a signal from a sensor. Further, for example, the slave device 21 includes an output terminal for outputting a control signal if it is an output unit for motor control or the like. The number of input terminals corresponds to the number of bits of the digital signal received by the input unit, and the number of output terminals corresponds to the number of bits of the control digital signal output by the output unit.

When the slave device 21 is an input unit that receives an analog signal, the number of input terminals corresponds to the number of bits of the digital signal obtained by A/D converting the received analog signal. When the slave device 21 is an output unit that outputs an analog signal, the number of output terminals corresponds to the number of bits of the digital signal for D/A converting and outputting the analog signal.

Figure 3:
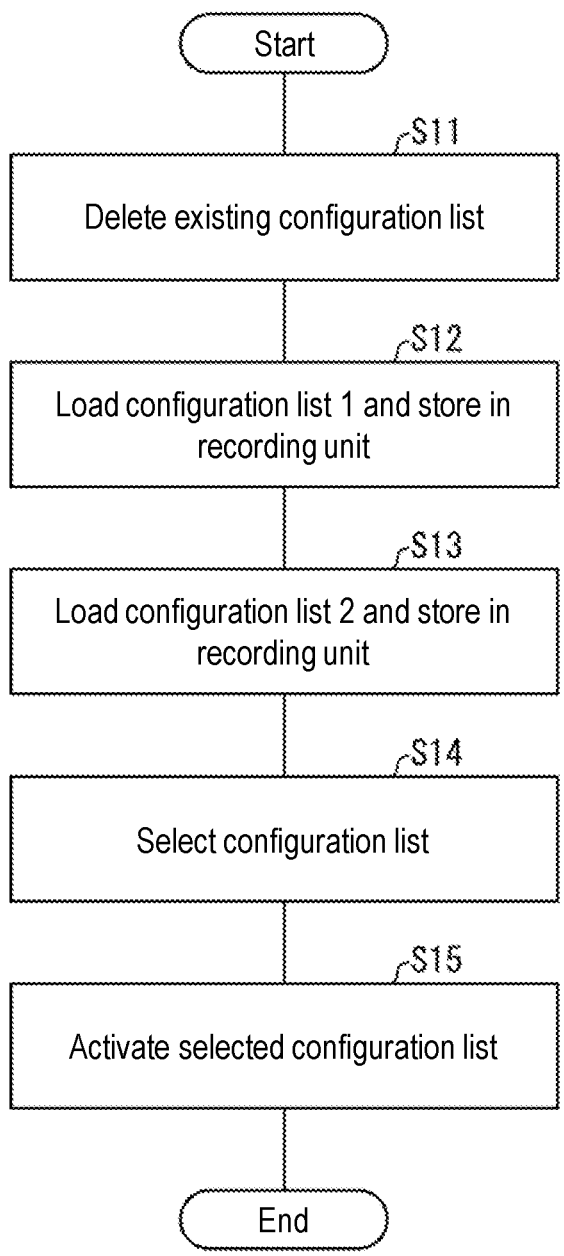
FIG. 3 is a flowchart showing a procedure for setting a configuration list in the control device according to the first embodiment of the present invention.

FIG. 3 is a flowchart for explaining the operation when a plurality of configuration lists is retained in the recording unit 13. The operation in which the administrator of the network system 1 causes the control device 10 to retain a plurality of configuration lists using the configurator 90 will be described below as an example. The configurator 90 supports the administrator by communicating with the control device 10 and executing the application for realizing the operations of the following steps S11 to S15 on the control device 10.

(Step S11)

The administrator deletes the configuration list stored in the recording unit 13 as needed through the configurator 90.

(Step S12)

Subsequently, the administrator selects the configuration list L1 stored as data in the configurator 90, loads it into the control device 10, and stores it in the recording unit 13.

(Step S13)

Subsequently, the administrator selects the configuration list L2 stored as data in the configurator 90, loads it into the control device 10, and stores it in the recording unit 13.

(Step S14)

Subsequently, the administrator selects an active configuration list from the configuration list stored in the recording unit 13 through the configurator 90.

(Step S15)

Subsequently, the administrator makes the selected configuration list L1 active in the control device 10 through the configurator 90. The control device 10 activates the configuration list L1 in the recording unit 13.

Through the above series of operations, the configuration list L1 and the configuration list L2 are stored in the recording unit 13, and one of them (the configuration list L1) is put into an active state. In the above description, the operation using the configurator 90 has been exemplified, but the application of the present invention is not limited to this method. The administrator may directly operate and set the control device 10. In this case, the configuration list may be loaded from an appropriate recording device such as a memory card to the control device 10.

(Operation of Control Device)

When the active configuration list is set as described above, the control device 10 can operate the network system 1. While the network system 1 is in operation, the control device 10 performs IO communication related to the control of each slave device 21 with reference to an active configuration list in order to control the slave-side system 20. The control device 10 executes the following characteristic operation for checking the configuration of the slave-side system 20 in parallel with the IO communication.

Figure 4:
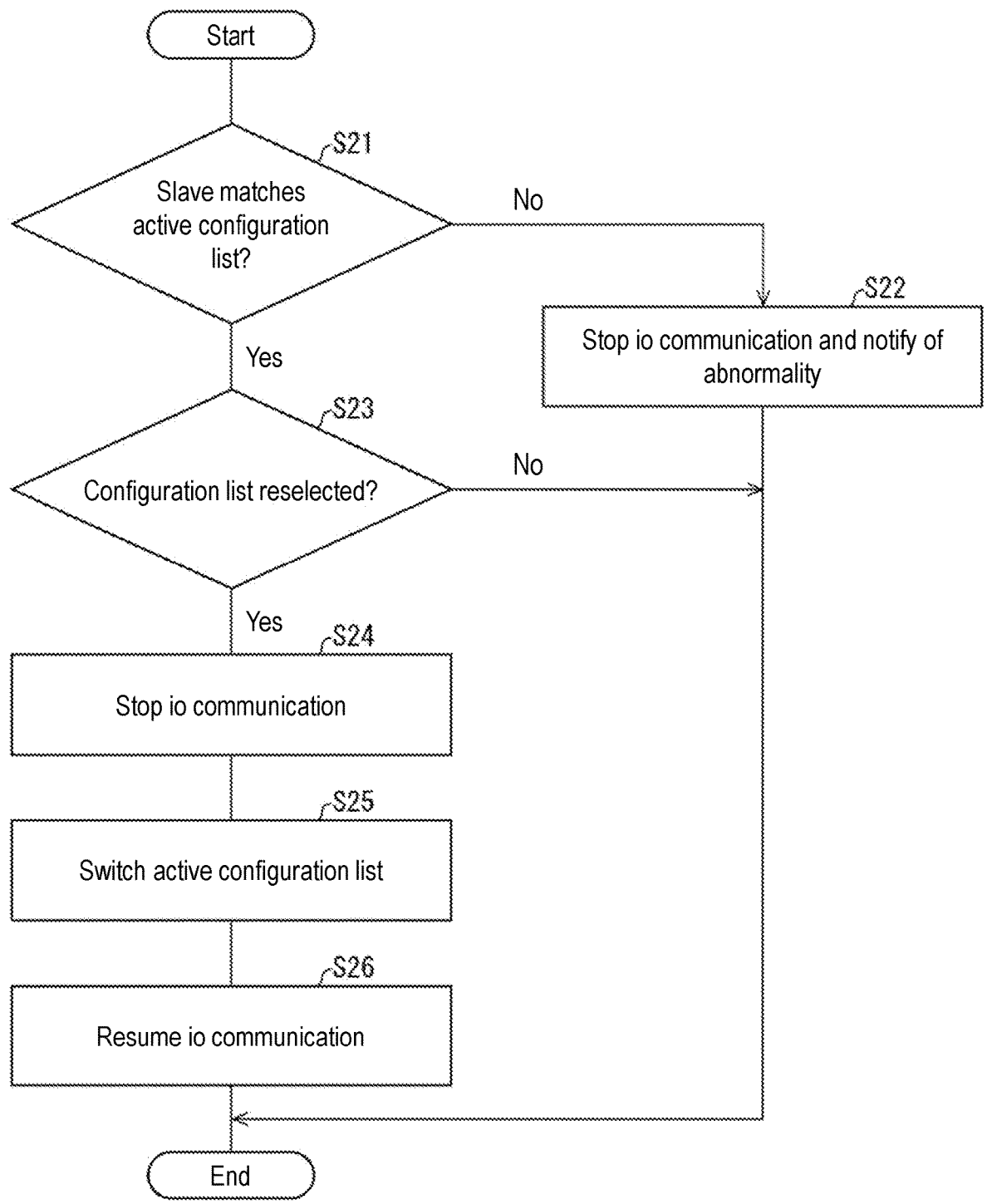
FIG. 4 is a flowchart showing the operation of the control device according to the first embodiment of the present invention.

FIG. 4 is a flowchart illustrating a characteristic operation for checking the configuration of the slave-side system 20, which is executed by the control device 10 according to the first embodiment. The control device 10 repeatedly executes the following flow from step S21 to step S26 while the network system 1 is in operation.

(Step S21)

The control unit 11 refers to the active configuration list L1 and performs communication for inquiring about device information to the address assigned to the slave device 21 in the configuration list. Then, it is determined whether the device information from the slave device 21 matches the configuration list L1. If it is determined that they match (YES in S21), the process proceeds to step S23, and in other cases (NO in S21), the process proceeds to step S22.

(Step S22)

The control unit 11 controls the communication unit 12 to stop IO communication with the slave device 21 described in the configuration list. That is, the control device 10 stops the control of the slave-side system 20. The control unit 11 controls the notification unit 16 to notify of an abnormality. Step S22 continues unless the administrator resolves the abnormal condition. Then the flow ends.

(Step S23)

The control unit 11 determines whether the configuration list has been reselected (selection of the configuration list L2) through the list selection unit 14. If it is determined that the reselection has been made (YES in S23), the process proceeds to step S24, and in other cases (NO in S23), the flow ends.

(Step S24)

The control unit 11 controls the communication unit 12 to stop IO communication with the slave device 21 described in the configuration list. That is, the control device 10 stops the control of the slave-side system 20.

(Step S25)

Subsequently, the control unit 11 activates the selected configuration list L2 in the recording unit 13.

(Step S26)

Subsequently, the control unit 11 controls the communication unit 12 to resume IO communication with the slave device 21 described in the configuration list. That is, the control device 10 resumes control of the slave-side system 20. Then the flow ends.

§ 3 Operation Example

An embodiment as an operation example of the control device 10 according to the first embodiment is shown below.

Example 1

Figure 5:
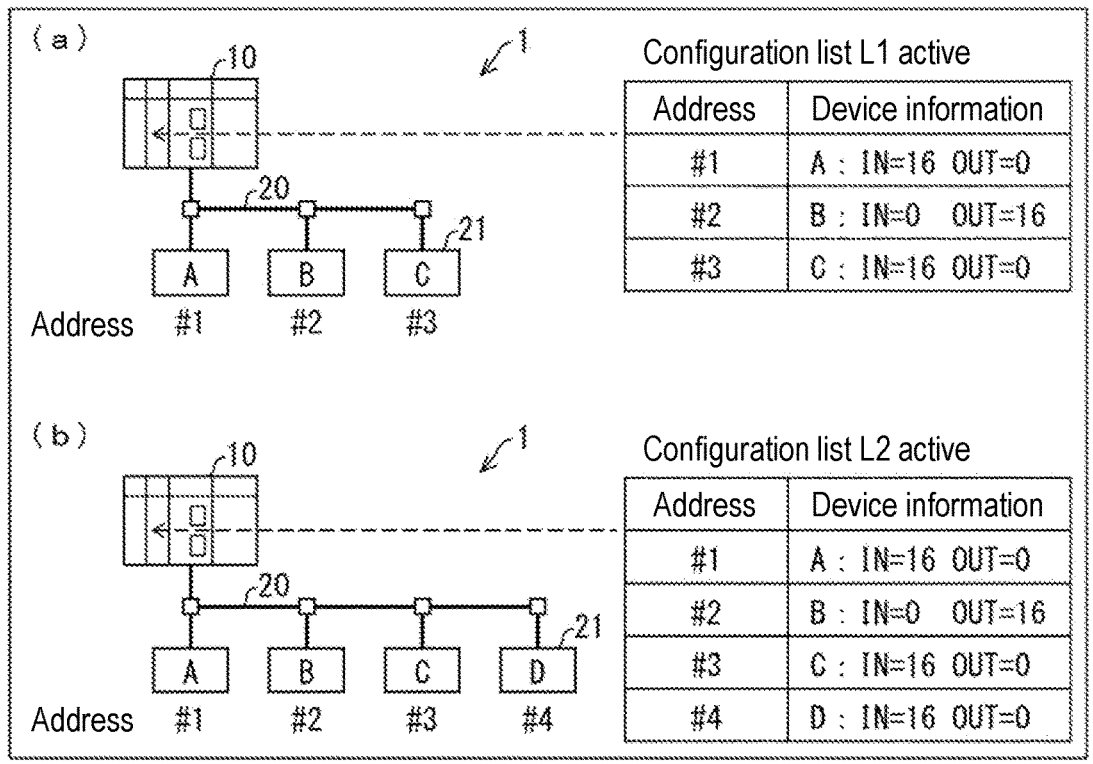
FIG. 5 is a diagram showing a case of Example 1 of the present invention in which (a) shows the state before the setup change, and (b) shows the state after the setup change.

FIG. 5 is a diagram for explaining the operation of the control device 10 of Example 1. Example 1 is a case in which the slave device D is added to the slave-side system 20 composed of the slave devices A to C according to the switching of the product to be produced. (a) and 5(b) of FIG. 5 show the configuration of the network system 1 when producing product "a" before switching and product "b" after switching, respectively.

The configuration list L1 corresponding to the slave-side system 20 before switching is a table for slave devices A to C, and addresses #1 to #3 are assigned to the slave devices A to C, respectively. The configuration list L2 corresponding to the slave-side system 20 after switching is a table for slave devices A to D, and the slave device D to which the address #4 is assigned is added from the configuration list L1. The configuration list L1 and the configuration list L2 are retained in the recording unit 13 of the control device 10.

In the state of producing the product "a" before switching shown in (a) of FIG. 5, the configuration of the slave-side system 20 matches the configuration list L1. While the network system 1 is in operation, the control device 10 executes a control program for producing the product "a", and also performs communication for inquiring about device information to the addresses (#1 to #3) in the configuration list L1. The device information obtained from each of the slave devices A to C matches the device information in the configuration list L1 (YES in step S21). Therefore, the IO communication is not stopped and the abnormality is not notified due to the inconsistency in the configuration of the slave-side system 20.

Next, the operation performed by the administrator of the network system 1 at the time of setup change will be described. When the required production of the product "a" is completed, the administrator operates the control device 10 to end the control program for producing the product "a". Then, the IO communication between the control device 10 and the slave devices A to C is stopped.

The administrator connects the slave device D to the slave-side system 20 (in the example of FIG. 1, it corresponds to replacing the partial system 201 with the partial system 202 and reconnecting). Next, the administrator operates the control device 10 to select the configuration list L2

(YES in step S23). Then, the active configuration list is switched to the configuration list L2 (step S25).

The administrator operates the control device 10 to start the execution of the control program for producing the product "b". In this way, the setup change is completed.

Then, IO communication is started between the control device 10 and the slave devices A to D, and the product "b" after switching shown in (b) of FIG. 5 is produced. The device information obtained from each of the slave devices A to D matches the device information in the configuration list L2 (YES in step S21). Therefore, the IO communication is not stopped and the abnormality is not notified due to the inconsistency in the configuration of the slave-side system 20.

Example 2

Figure 6:
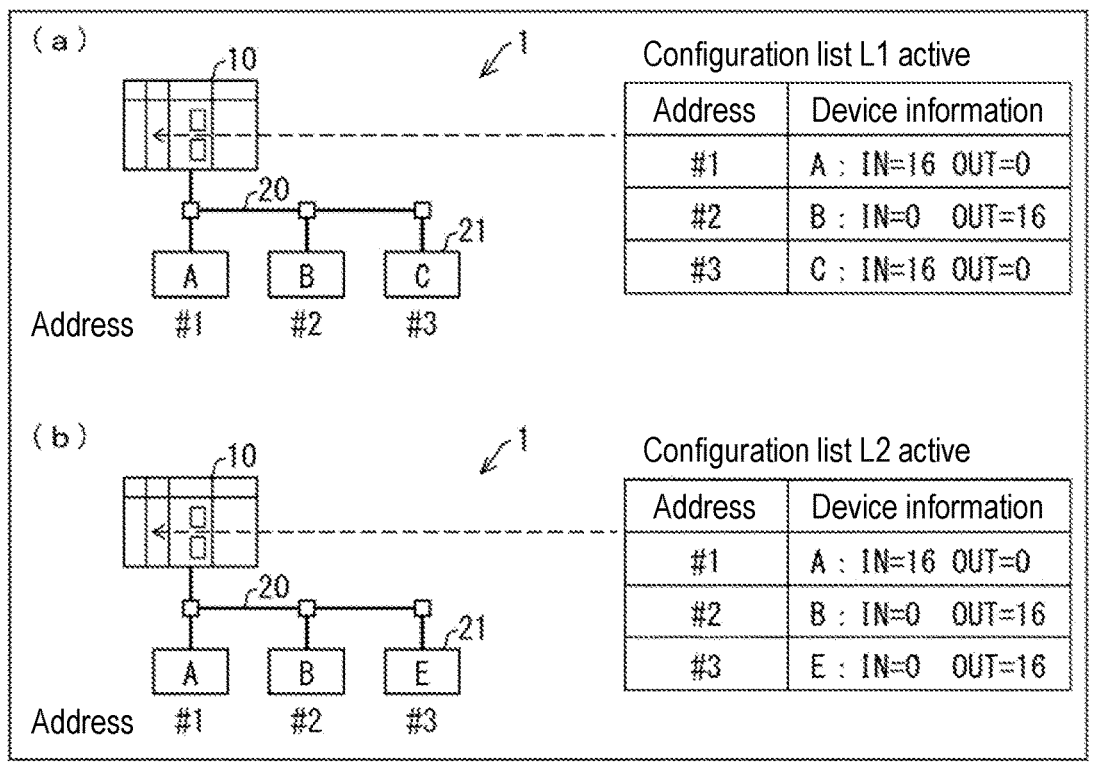
FIG. 6 is a diagram showing a case of Example 2 of the present invention in which (a) shows the state before the setup change, and (b) shows the state after the setup change.

FIG. 6 is a diagram for explaining the operation of the control device 10 of Example 2. Example 2 is a case in which the slave device C is replaced with the slave device E as the product to be produced is switched, and the other configurations are the same as those of Example 1.

In Example 2, the configuration list L2 corresponding to the slave-side system 20 after switching is a table for the slave devices A, B, and E. The configuration list L2 is modified from the configuration list L1 so that the slave device E is assigned to the address #3. The configuration list L1 and the configuration list L2 are retained in the recording unit 13 of the control device 10.

In the state of producing the product "a" before switching shown in (a) of FIG. 6, the configuration of the slave-side system 20 matches the configuration list L1. While the network system 1 is in operation, the control device 10 executes a control program for producing the product "a", and also performs communication for inquiring about device information to addresses #1 to #3 in the configuration list L1. The device information obtained from each of the slave devices A to C matches the device information in the configuration list L1 (YES in step S21). Therefore, the IO communication is not stopped and the abnormality is not notified due to the inconsistency in the configuration of the slave-side system 20.

The setup change operation for switching the products to be produced is the same as that in Example 1. When the execution of the control program for producing the product "b" is started, IO communication is started between the control device 10 and the slave devices A, B, and E, and the product "b" after switching shown in (b) of FIG. 6 is produced. The device information obtained from each of the slave devices A, B, and E matches the device information in the configuration list L2 (YES in step S21). Therefore, the IO communication is not stopped and the abnormality is not notified due to the inconsistency in the configuration of the slave-side system 20.

§ 4 Operation and Effect

According to the first embodiment, since the control device 10 checks the configuration of the slave-side system 20 using the configuration list, it is possible to quickly detect an abnormality in the configuration. Each configuration list has a property that it is determined when the configuration of the slave-side system 20 required for the production of the product "a" and the product "b" is determined, for example. It is not necessary to rewrite the configuration list every setup change, and it is possible to prevent occurrence of a malfunction due to a mistake in rewriting.

Since only the slave device having the address described in the configuration list is accessed, the communication cycle can be shortened even if the slave device not listed in the configuration list is connected to the slave-side system 20.

The control device 10 has a plurality of configuration lists in which a predetermined portion of the slave-side system 20 has a different configuration, and can easily switch the active configuration list among them. Therefore, the administrator of the network system 1 can easily complete the setup change operation for switching the products to be produced. At the time of setup change, the administrator does not need to perform a complicated operation in the prior art as described in the problem to be solved by the invention. Since it is not necessary to use other devices such as tools and configurators other than the control device 10 at the same time when changing the configuration list, and the time required for transferring or rewriting data from other devices is not required, it is possible to quickly switch the configuration list at the production site.

Therefore, according to the control device 10 according to the first embodiment, the setup change can be efficiently executed, and the occurrence of mistakes due to complicated operation is suppressed. As a result, an efficient production line can be realized.

As a specific example in the first embodiment, when DeviceNet (registered trademark) is applied, various network topologies such as T-branch and star type can be adopted as the topology of the network system 1. Therefore, it is highly compatible with the present invention in which a portion of the configuration of the slave-side system 20 is changed according to the product to be produced.

In the above, in the first embodiment including Example 1 and Example 2, the case where there are two configuration lists has been described in detail as an example. However, the number of configuration lists is not limited to this, and may be three or more.

Second Embodiment

Another embodiment of the present invention is described below. For convenience of explanation, the same reference numerals are added to the components having the same functions as the components described in the above embodiment, and the description will not be repeated.

The configuration of the control device 10 according to the second embodiment is the same as that of the first embodiment shown in FIG. 2. The configuration of the network system 1 to which the control device 10 according to the second embodiment is applied is the same as that of the first embodiment shown in FIG. 1. However, in the second embodiment, the number of configuration lists L retained in the recording unit 13 may be at least one, which is different from the first embodiment. Further, in the second embodiment, the content of the configuration list L is different from that of the first embodiment.

(Configuration List)

In the control device 10 according to the second embodiment, the configuration list L (third configuration list) includes the address assigned to each slave device and switching information (additional information) of each slave device as well as the device information thereof. Here, the switching information is information indicating that the configuration of a predetermined portion of the slave-side system 20 is changed due to the switching of the product to be produced. The content of the switching information (additional information) is the information "with switching"

(second information) indicating that there is switching, or the information "without switching" (first information) indicating that there is no switching.

The switching information of the slave device 21 belonging to the partial system 201, which is shown in FIG. 1 and is used for the production of the product "a" and not used for the production of the product "b", is set to "with switching". The switching information of the slave device 21 belonging to the partial system 202, which is not used in the production of the product "a" but is used in the production of the product "b", is set to "with switching". In the slave-side system 20 shown in FIG. 1, the switching information of the slave devices 21 of the common portion that does not belong to the partial system 201 and the partial system 202 is set to "without switching".

Note that "without switching" and "with switching" in the switching information (additional information) are merely names indicating two different states of the switching information, and the terms themselves have no meaning. Such names are merely used in the specification for convenience in order to make the operation easier to understand. It is no difference in describing "without switching" and "with switching" as "first information" and "second information", or as symbols "X" and "Y", respectively. In the configuration list L as digital information retained in the recording unit 13, as an example, it can be stored as a flag such that "without switching" and "with switching" are "1" and "0", respectively.

Figure 7:
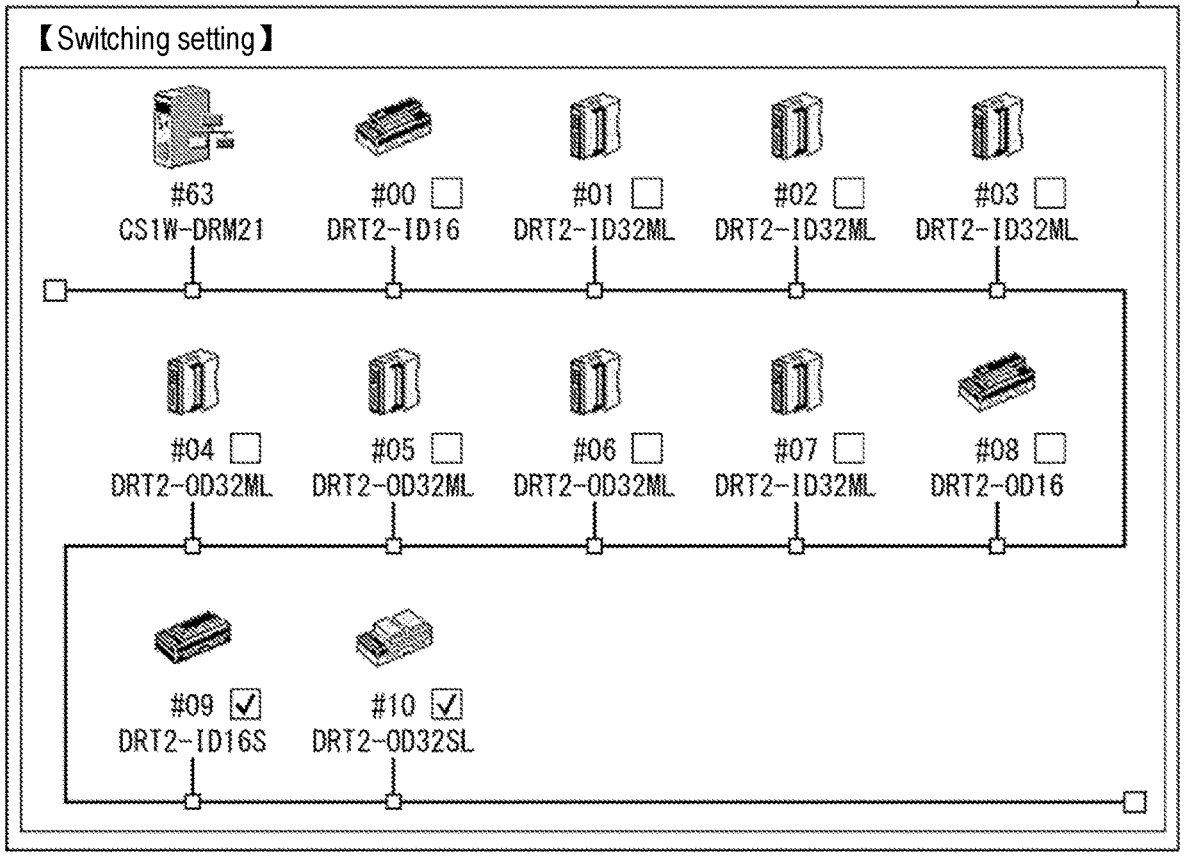
FIG. 7 is a diagram showing a screen of a configurator for creating a configuration list applied to a control device according to a second embodiment of the present invention.

FIG. 7 shows an example of the screen of the display device 91 when the administrator of the network system 1 uses the configurator 90 to set the switching information in the configuration list. On the screen, the slave devices 21 listed in the configuration list are displayed in a list with illustrations, and a check box for setting switching information is arranged for each slave device. In FIG. 7, it is shown that the slave devices 21 at addresses #9 and #10 are checked, and that these slave devices 21 are set to "with switching". The slave devices 21 at other addresses are not selected (checked) by the administrator and are set to "without switching".

The configurator 90 communicates with the control device 10 to set and activate the configuration list in the control device 10. The configurator 90 supports the administrator by executing an application that realizes these operations.

(Operation of Control Device)

While the network system 1 is in operation, the control device 10 performs IO communication related to the control of each slave device 21 with reference to an active configuration list in order to control the slave-side system 20. The control device 10 executes the following characteristic operation for checking the configuration of the slave-side system 20 in parallel with the IO communication.

Figure 8:
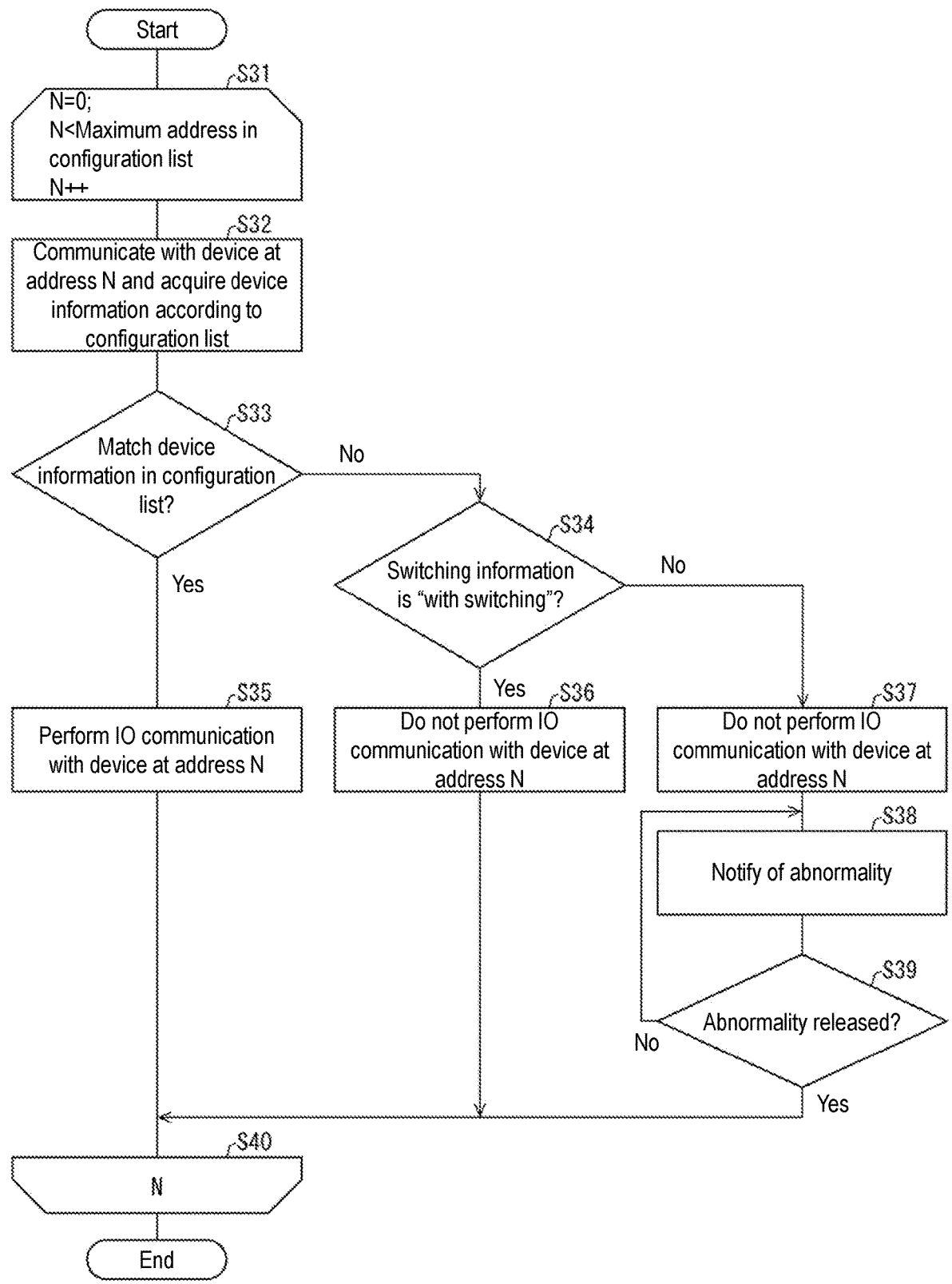
FIG. 8 is a flowchart showing the operation of the control device according to the second embodiment of the present invention.

FIG. 8 is a flowchart illustrating a characteristic operation for checking the configuration of the slave-side system 20, which is executed by the control device 10 according to the second embodiment. The control device 10 repeatedly executes the following flow from step S31 to step S40 while the network system 1 is in operation.

(Step S31)

Step S31 is a start point of the loop with step S40 as the return point. The initial value of the address number N is set to 0, N is increased (incremented) by 1 each time the process proceeds from step S31 to step S32, and the steps of S32 and later are executed as long as the maximum value of the address in the configuration list is not exceeded, and the loop is repeated.

(Step S32)

The control unit 11 attempts to communicate with the slave device 21 having the address number N in the configuration list L through the communication unit 12, and acquires device information from the slave device 21.

(Step S33)

Subsequently, the control unit 11 determines whether the device information matches the device information in the configuration list L. Even if communication with the slave device 21 having the address number N cannot be performed, it is considered that the device information does not match the device information in the configuration list L. If it is determined that it matches the device information in the configuration list L (YES in S33), the process proceeds to step S35, and in other cases (NO in S33), the process proceeds to step S34.

(Step S34)

The control unit 11 determines whether the switching information of the slave device 21 having the address number N in the configuration list L is "with switching". If it is determined that it is "with switching", the process proceeds to step S36 (YES in S34), and in other cases (NO in S34), the process proceeds to step S37.

(Step S35)

The control unit 11 performs IO communication with the slave device 21 having the address number N. In this case, the abnormality is not notified. This is because the actual situation matches the device information in the configuration list L. Next, the process proceeds to step S40.

(Step S36)

The control unit 11 does not perform IO communication with the slave device 21 having the address number N. In this case, the abnormality is not notified. This is to prevent notification of an abnormality even if the slave device 21 is not connected when the switching information is "with switching". Next, the process proceeds to step S40.

(Step S37)

The control unit 11 does not perform IO communication with the slave device 21 having the address number N.

(Step S38)

Subsequently, the control unit 11 controls the notification unit 16 to notify that the slave device 21 having the address number N is abnormal. This is to ask the administrator to take measures.

(Step S39)

Subsequently, the control unit 11 determines whether the abnormality has been released by the administrator. If it is determined that the abnormality has been released (YES in S39), the process proceeds to step S41, and in other cases (NO in S39), the process proceeds to step S38.

(Step S40)

Step S40 is the return point of the loop. When the loop is exited by the determination in step S31, the flow ends.

As described above, the control device 10 performs IO communication with the slave device 21 of each address number if it matches the configuration list L (step S35), and does not perform IO communication if it does not match (step S36, step S37). Here, even when communication with the slave device 21 is not possible, it is considered that the device information does not match the device information in the configuration list L.

The control device 10 notifies the slave device 21 of each address number of an abnormality when it does not match the configuration list L and the switching information is "without switching" (step S38). Even if it does not match the configuration list L, when the switching information is "with switching", no abnormality is notified.

In the control of IO communication, the control device 10 executes IO communication with the slave device 21 having an address number determined to perform IO communication, and does not execute IO communication (does not control slave devices) with the slave device 21 having an address number determined not to perform IO communication.

Example 3

Figure 9:
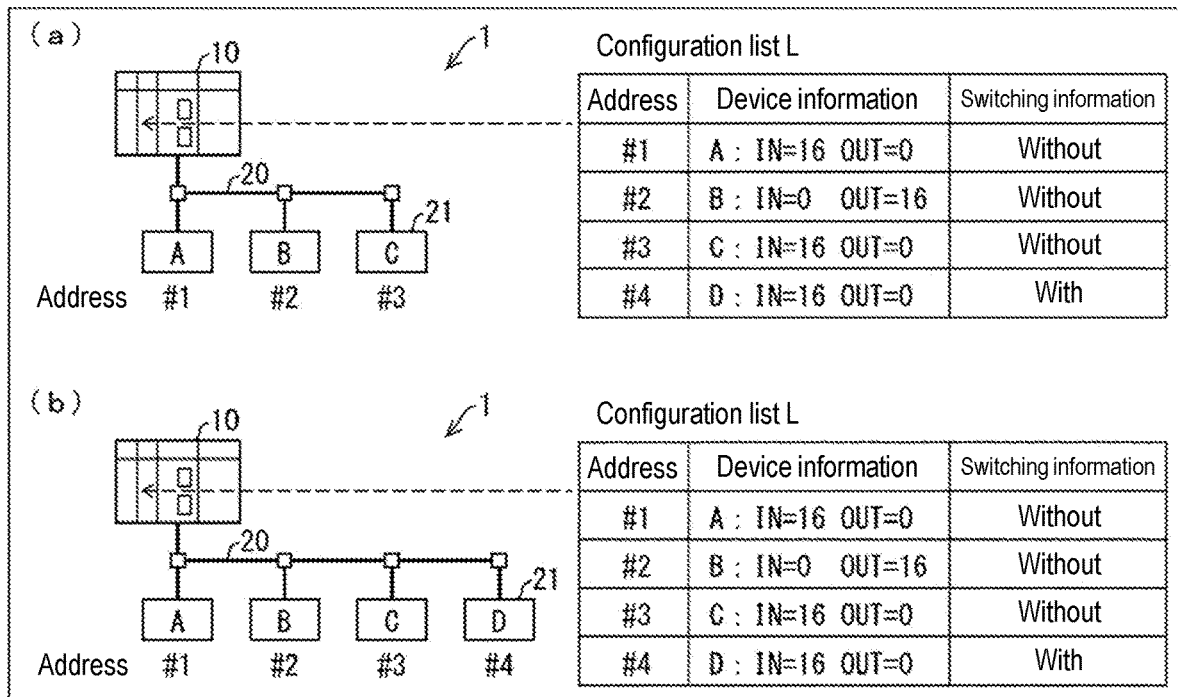
FIG. 9 is a diagram showing a case of Example 3 of the present invention in which (a) shows the state before the setup change, and (b) shows the state after the setup change.

With reference to FIG. 9, Example 3 as an operation example of the control device 10 according to the second embodiment is shown. FIG. 9 is a diagram for explaining the operation of the control device 10 of Example 3. Example 3 is a case in which the slave device D is added to the slave-side system 20 composed of the slave devices A to C according to the switching of the products to be produced. (a) and (b) of FIG. 9 show the configuration of the network system 1 when producing the product "a" before switching and the product "b" after switching, respectively.

The configuration list L is a table for the slave devices A to D, and addresses #1 to #4 are assigned to the slave devices A to D, respectively. The switching information of the slave devices A to C in which a device is not replaced before and after the setup change is set to "without switching". The switching information of the slave device D in which a device is replaced before and after the setup change is set to "with switching".

In the state of producing the product "a" before switching shown in (a) of FIG. 9, the configuration of the slave-side system 20 matches the configuration list L for the addresses #1 to #3 (slave devices A to C) (YES in step S33). Therefore, it is controlled so that IO communication with these devices is performed (step S35). In addition, there is no notification of abnormality regarding these devices.

Since the slave device D is not connected to the network system 1, communication is not established for the address #4 (NO in step S33). Since the switching information is "with switching" in the configuration list L (YES in step S34), it is controlled so that IO communication is not performed (step S36). In addition, there is no notification of abnormality regarding the address #4.

Next, the operation performed by the administrator of the network system 1 at the time of setup change will be described. When the required production of the product "a" is completed, the administrator operates the control device 10 to end the control program for producing the product "a". Then, the IO communication between the control device 10 and the slave devices A to C is stopped.

The administrator connects the slave device D to the slave-side system 20 (in the example of FIG. 1, it corresponds to replacing the partial system 201 with the partial system 202 and reconnecting). Next, the administrator operates the control device 10 to execute the control program for producing the product "b". In this way, the setup change is completed.

In the state of producing the product "b" after switching shown in (b) of FIG. 9, the configuration of the slave-side system 20 matches the configuration list L for addresses #1 to #4 (slave devices A to D) (YES in step S33). Therefore, it is controlled so that IO communication to these devices is performed (step S35). In addition, there is no notification of abnormality regarding these devices.

Example 4

Figure 10:
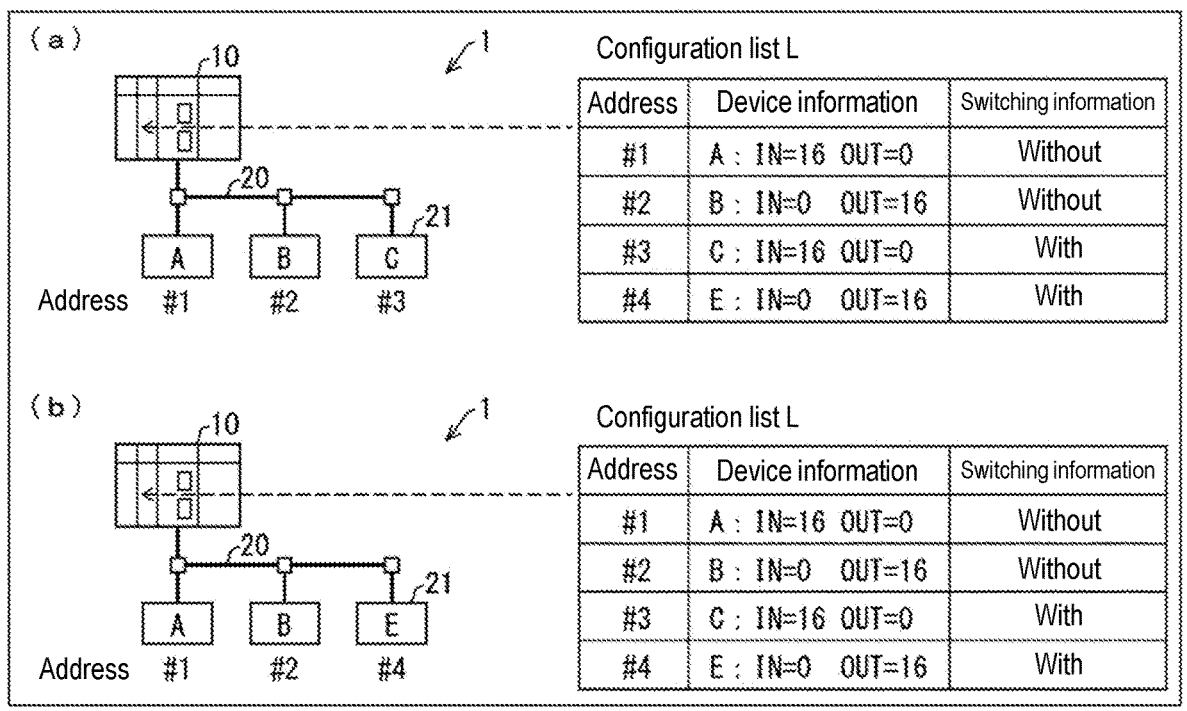
FIG. 10 is a diagram showing a case of Example 4 of the present invention in which (a) shows the state before the setup change, and (b) shows the state after the setup change.

With reference to FIG. 10, Example 4 as another operation example of the control device 10 according to the second embodiment is shown. FIG. 10 is a diagram for explaining the operation of the control device 10 of Example 4. Example 4 is a case in which the slave device C is replaced with the slave device E due to switching of the product, and the other configurations are the same as those of Example 3.

The configuration list L is a table for slave devices A to C and E, and addresses #1 to #4 that do not overlap are assigned to slave devices A to C and E, respectively. The switching information of the slave devices A and B in which a device is not replaced before and after the setup change is set to "without switching". The switching information of the slave devices C and E in which a device is replaced is set to "with switching".

In the state of producing the product "a" before switching shown in (a) of FIG. 10, the configuration of the slave-side system 20 matches the configuration list L for the addresses #1 to #3 (slave devices A to C) (YES in step S33). Therefore, it is controlled so that IO communication to these devices is performed (step S36). In addition, there is no notification of abnormality regarding these devices.

Since the slave device E is not connected to the network system 1, communication is not established for the address #4 (NO in step S33). However, since the switching information is "with switching" in the configuration list L (YES in step S34), it is controlled so that 10 communication is not performed (step S36). In addition, there is no notification of abnormality regarding address #4.

Next, the operation performed by the administrator of the network system 1 at the time of setup change will be described. When the required production of the product "a" is completed, the administrator operates the control device 10 to end the control program for producing the product "a". Then, the IO communication between the control device 10 and the slave devices A to C is stopped.

The administrator replaces the slave device C with the slave device E (in the example of FIG. 1, it corresponds to replacing the partial system 201 with the partial system 202 and reconnecting). Next, the administrator operates the control device 10 to execute the control program for producing the product "b". In this way, the setup change is completed.

In the state of producing the product "b" after switching shown in (b) of FIG. 10, the configuration of the slave-side system 20 matches a configuration list L for addresses #1, #2, and #4 (slave devices A, B, E) (YES in step S33). Therefore, it is controlled so that IO communication to these devices is performed (step S35). In addition, there is no notification of abnormality regarding these devices.

Since the slave device C is not connected to the network system 1, communication is not established for the address #3 (NO in step S33). However, since the switching information is "with switching" in the configuration list L (YES in step S34), it is controlled so that 10 communication is not performed (step S37). In addition, there is no notification of abnormality regarding address #3.

(Operation and Effect)

According to the second embodiment, since the control device 10 checks the configuration of the slave-side system 20 using the configuration list, it is possible to quickly detect an abnormality in the configuration. At that time, the abnormality is not notified to the address whose switching information is set to "with switching". Therefore, the administrator of the network system 1 can execute setup change without notification of an abnormality or stopping the network system 1 even if the configuration list is not switched by setting the switching information to "with switching" for devices of which the connection state is different before and after the setup change. Therefore, the administrator of the network system 1 can quickly and extremely easily complete the setup change operation for switching the product to be produced, which is very convenient for the administrator.

The configuration list L has a property that it is determined when the configuration of the slave-side system 20 required for the production of the product "a" and the product "b" is determined, for example. It is not necessary to rewrite the configuration list L every setup change, and it is possible to prevent occurrence of a malfunction due to a mistake in rewriting.

Since the control device 10 accesses only the slave device of the address described in the configuration list and actually connected, the communication cycle (control cycle) can be shortened.

Therefore, according to the control device 10 according to the second embodiment, the setup change can be efficiently executed, and the occurrence of mistakes due to a complicated operation is also suppressed. As a result, an efficient production line can be realized.

As a specific example in the second embodiment, when DeviceNet (registered trademark) is applied, various network topologies such as T-branch and star type can be adopted as the topology of the network system 1. Therefore, it is highly compatible with the present invention in which a portion of the configuration of the slave-side system 20 is changed according to the product to be produced.

Example of Realization by Software

The functional block (particularly, the control unit 11) of the control device 10 may be realized by a logic circuit (hardware) formed in an integrated circuit (IC chip) or the like, or may be realized by software.

In the latter case, the control device 10 includes a computer that executes commands of a program that is software that realizes each function. The computer includes, for example, one or more processors and includes a computer-readable recording medium that stores the program. Then, in the computer, the processor reads the program from the recording medium and executes the program, whereby the object of the present invention is achieved.

As the processor, for example, a Central Processing Unit (CPU) can be used. As the recording medium, in addition to a "non-temporary tangible medium" such as a Read Only Memory (ROM), a tape, a disk, a card, a semiconductor memory, a programmable logic circuit, or the like can be used.

A Random Access Memory (RAM) for expanding the above program may be further provided.

The program may be supplied to the computer via an arbitrary transmission medium (communication network, broadcast wave, and the like) capable of transmitting the program.

It should be noted that one aspect of the present invention can also be realized in the form of a data signal embedded in a carrier wave, in which the above program is embodied by electronic transmission.

SUMMARY

A control device according to one aspect of the present invention is a control device which is a master device used in a network system in which a plurality of slave devices constituting a slave-side system is connected to the master device, the control device being able to control the slave-side system to switch between a first system configuration and a second system configuration in which a predetermined portion is different from the first system configuration and other configurations are common, the control device including: a communication unit that transmits and receives data to and from the plurality of slave devices; a control unit that controls the communication unit; and a recording unit having at least one configuration list which represents a configuration of the slave-side system and includes an address and device information of each of the slave devices, wherein when controlling the first system configuration or the second system configuration, the control unit performs communication for inquiring about device information to an address in an active configuration list through the communication unit and determines that an abnormality has occurred at least when a result of the communication with respect to the common portion is different from the device information in the active configuration list.

According to the above configuration, it is possible to realize a control device that can perform setup change easily without requiring a complicated operation with respect to setup change which incurs a partial change in the configuration of a slave-side system in a master device (control device) that employs a configuration list.

The control device according to the aspect may further include a list selection unit, the recording unit may have a first configuration list representing the first system configuration and a second configuration list representing the second system configuration, the active configuration list may be the first configuration list or the second configuration list designated by the list selection unit, and the control unit may determine that an abnormality has occurred when the result of the communication is different from the device information in the active configuration list.

According to the above configuration, a specific configuration is realized in which it is determined that an abnormality has not occurred with respect to a predetermined partial change in the configuration of a slave-side system in a master device (control device) that employs a configuration list.

In the control device according to the aspect, the control unit may control the communication unit to stop transmission and reception of data to and from the slave-side system when the control unit determines that the abnormality has occurred.

According to the above configuration, when the configuration of the slave-side system is incorrect, the network system can be stopped and the network system (production process) can be prevented from performing an incorrect operation.

In the control device according to the aspect, the recording unit may have, as the configuration list, a third configuration list that is active when controlling the first system configuration and the second system configuration, the third configuration list may further include additional information about each of the slave devices, the additional information may be set in first information for the common portion and in second information for the others, and when the result of the communication with a slave device in the third configuration list is different from the device information in the third configuration list, the control unit may determine that the abnormality has occurred if the additional information of the slave device is the first information.

According to the above configuration, a specific configuration is realized in which it is determined that an abnormality has not occurred with respect to a predetermined partial change in the configuration of a slave-side system in a master device (control device) that employs a configuration list. In addition, it is possible to construct a production system with particularly high setup change efficiency.

In the control device according to the aspect, when the result of the communication with the slave device in the third configuration list is different from the device information in the third configuration list, the control unit may control the communication unit to stop transmission and reception of data to and from the slave device.

According to the above configuration, when the configuration of the slave-side system is incorrect, it is possible to stop the transmission and reception of data with the incorrect specific slave device, and it is possible to prevent the incorrect operation from being executed.

The control device according to the aspect may further include a notification unit, and the control unit may notify of the abnormality through the notification unit the result of the determination is abnormal.

According to the above configuration, the administrator of the network system can immediately recognize the occurrence of the abnormality.

The present invention is not limited to the above-described embodiments and examples, various modifications can be made within the scope of the claims, and the embodiments obtained from appropriate combinations of the technical means disclosed in different embodiments and examples are also included in the technical scope of the present invention.

REFERENCE SIGNS LIST

1 Network system
10 Control device
11 Control unit
12 Communication unit
13 Recording unit
14 List selection unit
15 Higher-order side interface
16 Notification unit
20 Slave-side system
201, 202 Partial system (predetermined portion of slave-side system)
21 Slave device
80 Higher-order network system
90 Configurator
91 Display device
92 Input device
L1 Configuration list (first configuration list)
L2 Configuration list (second configuration list)
L Configuration list (third configuration list)

The invention claimed is:

1. A control device which is a master device used in a network system in which a plurality of slave devices constituting a slave-side system is connected to the master device,
the control device being able to control the slave-side system to switch between a first system configuration and a second system configuration in which a predetermined portion is different from the first system configuration and other configurations are common, the control device comprising:
a processor, configured to
transmit and receive data to and from the plurality of slave devices;
a memory having a plurality of configuration lists which each of the plurality of configuration lists represents a configuration of the slave-side system and includes an address and device information of each of the plurality of slave devices, wherein,
when controlling the first system configuration or the second system configuration, the processor is configured to perform communication for inquiring about device information to an address in an active configuration list through the communication with the plurality of slave devices and determine that an abnormality has occurred at least when a result of the communication with respect to a common portion is different from the device information in the active configuration list,
the memory has, as the plurality of configuration lists, a third configuration list that is active when controlling the first system configuration and the second system configuration,
the third configuration list further includes additional information about each of the slave devices,
the additional information is set in first information for the common portion and in second information for other portions, and
when the result of the communication with a slave device in the third configuration list is different from the device information in the third configuration list, the processor is configured to determine that the abnormality has occurred if the additional information of the slave device is the first information, and
when the result of the communication with the slave device in the third configuration list is different from the device information in the third configuration list, the processor is configured to stop transmission and reception of data to and from the slave device when the processor determines that the abnormality has occurred.

2. The control device according to claim 1, wherein the processor is further configured to perform a list selection, wherein
the memory has a first configuration list representing the first system configuration and a second configuration list representing the second system configuration,
the active configuration list is the first configuration list or the second configuration list designated by the list selection, and
the processor is configured to determine that the abnormality has occurred when the result of the communication is different from the device information in the active configuration list.

3. The control device according to claim 1, wherein the processor is further configured to notify the abnormality when a result of determination is abnormal.

4. The control device according to claim 1, wherein the processor is further configured to select one of the plurality of configuration lists from the memory to set a selected configuration list as the active configuration list, and the active configuration list corresponds to the first system configuration or the second system configuration.

5. The control device according to claim 1, wherein when the device information does not match the active configuration list, the processor is configured to stop the communication with the each of the plurality of slave devices described in the configuration lists, and to determine that the abnormality is occurred.

6. The control device according to claim 1, wherein when the device information matches the active configuration list, the processor is configured to determine that the plurality of configuration lists is reselected, and to further set a reselected configuration list as the active configuration list.

\* \* \* \* \*